United States Patent [19]
Turner et al.

[11] Patent Number: 5,651,850
[45] Date of Patent: Jul. 29, 1997

[54] METHOD OF FABRICATING HYBRID COMPOSITE STRUCTURES

[75] Inventors: C. Warren Turner, Renton; Richard B. Evans, Maple Valley; Matthew K. S. Lum, Mercer Island, all of Wash.

[73] Assignee: The Boeing Company, Seattle, Wash.

[21] Appl. No.: 585,306

[22] Filed: Jan. 11, 1996

[51] Int. Cl.$^6$ .................................................. B65H 81/00
[52] U.S. Cl. ........................... 156/171; 156/172; 156/173; 156/190; 244/119
[58] Field of Search ................................. 156/171, 172, 156/173, 190, 189; 244/119

[56] References Cited

U.S. PATENT DOCUMENTS

| | | | |
|---|---|---|---|
| 3,490,983 | 1/1970 | Lee | 244/119 X |
| 3,711,934 | 1/1973 | Zorowski et al. | 156/165 X |
| 3,959,091 | 5/1976 | Moji et al. | |
| 3,989,876 | 11/1976 | Moji et al. | |
| 4,010,884 | 3/1977 | Rothman | |
| 4,473,446 | 9/1984 | Locke et al. | |
| 4,489,123 | 12/1984 | Schijve et al. | |
| 4,500,589 | 2/1985 | Schijve et al. | |
| 4,714,509 | 12/1987 | Gruber | |
| 4,715,923 | 12/1987 | Knoll | |
| 4,790,898 | 12/1988 | Woods | |
| 4,859,267 | 8/1989 | Knoll | |
| 4,894,105 | 1/1990 | Dyksterhouse et al. | |
| 4,919,739 | 4/1990 | Dyksterhouse et al. | |
| 4,935,291 | 6/1990 | Gunnink et al. | |
| 4,943,472 | 7/1990 | Dyksterhouse et al. | |
| 4,992,323 | 2/1991 | Vogelesang et al. | |
| 5,008,061 | 4/1991 | Bluck et al. | 156/172 X |
| 5,030,488 | 7/1991 | Sobolev | |
| 5,039,571 | 8/1991 | Vogelesang et al. | |

(List continued on next page.)

FOREIGN PATENT DOCUMENTS

| | | | |
|---|---|---|---|
| 307 215 B1 | 3/1989 | European Pat. Off. | |
| 463 611 A2 | 1/1992 | European Pat. Off. | |
| 2733495 | 2/1979 | Germany | 156/172 |
| 62-257835 | 11/1987 | Japan | 156/172 |

OTHER PUBLICATIONS

Chase, G., et al. "Making a Laminated Metal–Insulation–Metal Tube," IBM Technical Disclosure Bulletin, vol. 13, No. 3, Aug. 1970, pp. 685–686.

FIBERITE® Data Sheet 5: "*Fabricating with Aromatic Polymer Composite, APC-2,*" 1986.

B. Blichfeldt and J.E. McCarty, "*Analytical and Experimental Investigation of Aircraft Metal Structures Reinforced with Filamentary Composites, Phase II—Structural Fatigue, Thermal Cycling, Creep, and Residual Strength,*" NASA Contractor Report: Jun., 1984.

*Primary Examiner*—Jeff H. Aftergut
*Attorney, Agent, or Firm*—Christensen O'Connor Johnson & Kindness

[57] ABSTRACT

A hybrid composite structure is formed from layers of gore strips (12), polymeric matrix composite (71) comprising a resin impregnated slit tape or tow, and a central honeycomb layer formed from a plurality of rectangular sections (72). The first two steps include forming a plurality of the gore strips and providing a mold, or lay-up mandrel (10). Thereafter, a first set of gore strips is applied to the lay-up mandrel to form a first gore strip layer. Subsequently, the composite material in form of resin impregnated slit tape or tow is applied to the first gore strip layer to form a first composite material layer. Next, a second set of gore strips is applied to the first layer of polymeric matrix composite, opposite the first gore strip layer, to form at least one other gore strip layer. This creates a first sandwich structure having gore strips as the first and last layers of the structure. Thereafter, the layer of honeycomb material is applied to the last layer of the first sandwich structure. Finally, a second sandwich structure, substantially identical to the first sandwich structure, is formed on the side of the honeycomb layer opposite the first sandwich structure. Thus, a hybrid composite structure is formed having first and second sandwich structures separated by a central honeycomb layer.

21 Claims, 4 Drawing Sheets

U.S. PATENT DOCUMENTS

| | | |
|---|---|---|
| 5,128,198 | 7/1992 | Dyksterhouse et al. . |
| 5,143,276 | 9/1992 | Mansbridge et al. . |
| 5,160,561 | 11/1992 | Gruber . |
| 5,160,568 | 11/1992 | Gruber . |
| 5,160,771 | 11/1992 | Lambing et al. . |
| 5,181,647 | 1/1993 | Runyan . |
| 5,207,848 | 5/1993 | Maloney et al. ............... 156/172 |

METHOD OF FABRICATING HYBRID COMPOSITE STRUCTURES

FIELD OF THE INVENTION

The present invention relates generally to fabrication methods for laminated structures and, more particularly, to fabrication methods for hybrid composite laminates.

BACKGROUND OF THE INVENTION

Plans for new, faster supersonic civilian transport aircraft specify a fuselage made from a hybrid composite structures. The planned cruising speeds for these aircraft, well in excess of the speed of sound, will subject the fuselage for these aircraft to sustained high operating temperatures. Neither all metal nor all polymeric matrix composite structures are satisfactory for economical sustained use in transporting civilian passengers under these conditions. Designers have therefore turned to hybrid composite structures.

Hybrid composite structures generally include layers of metal, polymeric matrix composite, and honeycomb material bonded to one another in a sandwich type of arrangement. These types of structures can withstand sustained high operating temperatures and have a high strength-to-weight ratio, both of which are critical for high speed transport applications.

However, hybrid composite structures are difficult to manufacture. One of the largest contributors to this difficulty is the amount of manual labor required during fabrication. Present fabrication techniques for producing hybrid composite structures are similar to techniques used in producing conventional polymeric matrix composite structures. Specifically, the various layers in the structure are laid-up with one another on a lay-up mandrel in a laborious process. Typically, thereafter the entire structure is manually sealed in a vacuum bag and placed in an autoclave for consolidation, cure and bonding of the various layers to one another.

Additionally, integral, large scale parts can be difficult to manufacture from some types of hybrid composite structures. For example, hybrid composite structures formed from aramid polymeric matrix composite and aluminum, known as ARALL, usually require stretching as part of the manufacturing process. The stretching process creates difficulties when attempting to form integral, large scale parts that must conform to close manufacturing tolerances. As a practical matter, large parts formed from ARALL thus must include several smaller ARALL sections that fasten together to form the part. The same is also true for hybrid composite structures formed from glass polymeric matrix composite and aluminum, known as GLARE.

Automatic tape laying machines have reduced fabrication costs in conventional polymeric matrix composite structures. The tape laying machines automatically place layers of composite impregnated tape, rather than composite sheets, on a lay-up mandrel, a method which can significantly reduce labor costs for some parts.

However, present fabrication techniques for hybrid composite structures still rely upon manually placing the metal and honeycomb layers of the structure on a lay-up mandrel. When using exotic metal foils with anodized surfaces, manual contact with the anodized surfaces during fabrication must be prevented to avoid contamination. Thus, manual lay-up techniques are not satisfactory.

SUMMARY OF THE INVENTION

The present invention provides a method for forming a hybrid composite structure. These fabrication processes minimize material handling, maximize lay-up efficiency, and reduce fabrication time, all of which provide a more economical end product. A mold or lay-up mandrel is provided. In its preferred form it is tubular, for example, in the shape of a fuselage section that may have a compound contour. The first step of the method comprises forming a plurality of metal gore strips. Thereafter, a first set of the gore strips is applied to the lay-up mandrel to form a first gore skin layer. Subsequently, a polymeric matrix composite material is applied to the first gore skin layer to form a first layer of composite material. Next, a second set of the gore strips is applied to the first composite layer, opposite the first gore layer, to form at least a second gore layer. This creates a first sandwich structure having gore strips as the first and last layers of the structure. Thereafter, a layer of a honeycomb material is applied to the last layer of the first sandwich structure using an adhesive. Further, a second sandwich structure, substantially identical to the first sandwich structure, is formed on the side of the honeycomb layer opposite the first sandwich structure. Thus, a hybrid composite structure is formed having first and second sandwich structures separated by a central honeycomb layer.

Preferably, the gore strips are applied to the lay-up mandrel as follows by first winding the gore strips onto a spool or cassette. Then, the gore strips are applied to the lay-up mandrel by unwinding each gore strip from the spool or cassette as this arrangement is moved longitudinally along the lay-up mandrel. After the application of each gore strip, the lay-up mandrel is rotated through a predefined angle to position the arrangement adjacent a previously applied gore strip. The next gore strip can thus be applied alongside the first by unwinding the next gore strip from the spool or cassette as this arrangement is being moved longitudinally along the mandrel. This results in the gore strips being applied to the lay-up mantel in an edge-to-edge relationship. The steps of moving the spool/cassette arrangement, unwinding gore-strips, and incrementally rotating the lay-up mandrel am repeated until all of the gore strips for that layer have been applied.

In the preferred embodiment, an advanced fiber placement mechanism is used to apply the polymeric matrix composite material to the lay-up mandrel. This is accomplished by supplying the composite material in the form of resin impregnated fiber arranged in a strand-like form, i.e. slit tape or tow. The polymeric matrix composite is loaded onto the advanced fiber placement mechanism, which moves longitudinally along the lay-up mandrel. As the mechanism moves along the lay-up mandrel, the lay-up mandrel is rotated to apply the polymeric matrix composite material to a gore skin layer, preferably in a helical pattern encircling the layer.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

Figure 1:
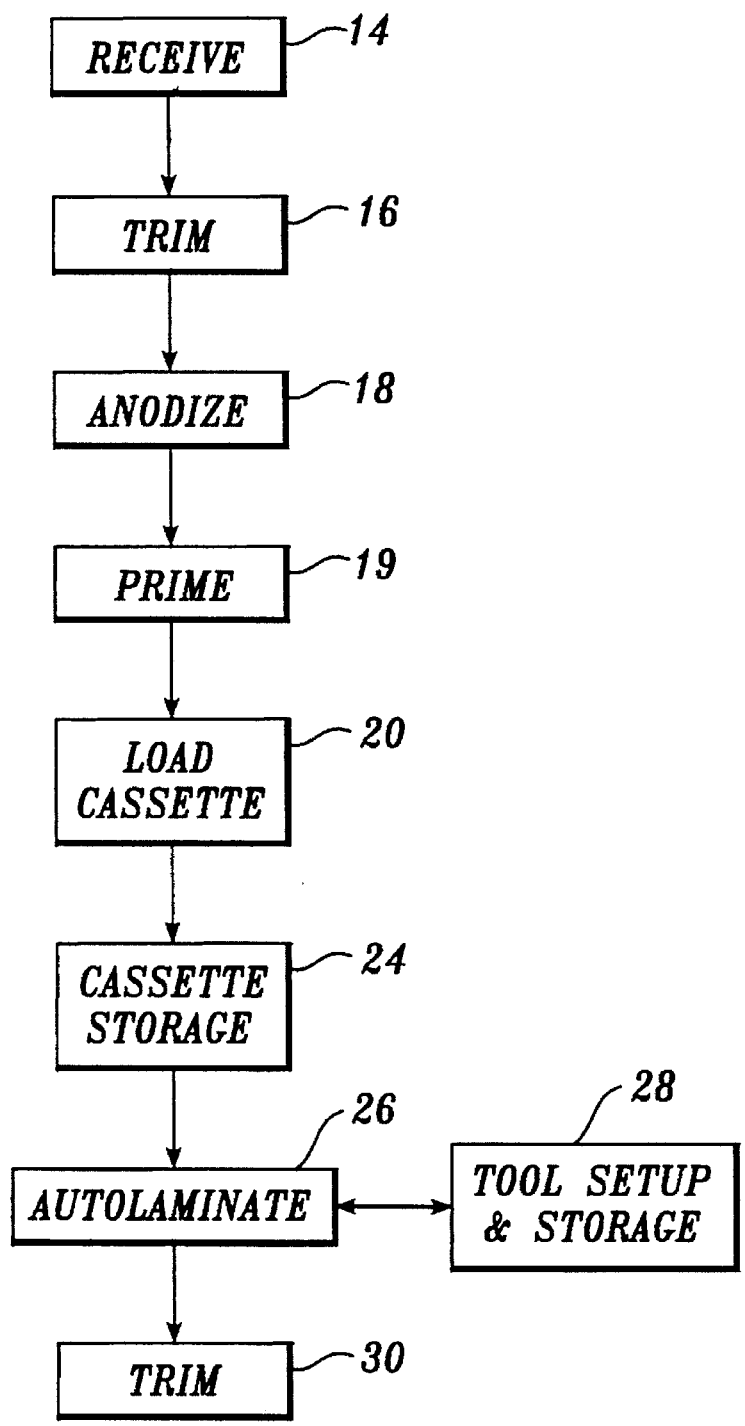
FIG. 1 is a flow diagram illustrating a preferred embodiment of constructing a hybrid composite structure in accordance with the present invention.

The present invention is directed to a method for economically producing hybrid composite structures. Before proceeding with a detailed description of the preferred embodiment, a brief description of the hybrid structure preferably produced by the method is provided.

In accordance with the preferred embodiment, a hybrid composite structure having a central layer of a honeycomb material is interleaved between two skins of metal foil and two skins of a polymeric matrix composite. To form the structure, a layer of titanium alloy sheet or foil is bonded to each side of the honeycomb material. A layer of the polymeric matrix composite is bonded to each of the titanium alloy foil layers. Yet another titanium alloy foil layer is bonded to each of the polymeric matrix composite layers. An additional polymeric matrix composite layer is bonded to each of these titanium alloy foil layers, followed by a final, outer (and inner) titanium alloy foil layer bonded to each of these polymeric matrix composite layers.

Thus, the resulting sandwich structure includes a central honeycomb layer and three layers of titanium alloy foil and two layers of polymeric matrix composite bonded to each side of the central honeycomb layer. Additional layers of polymeric matrix composite and/or titanium alloy foil may be added to the inner and outer skins as required for strengthening local areas of the sandwich structure.

Each of the principal components of the structure constructed in accordance with the present invention, i.e., the titanium sheet foil, the polymeric matrix composite and the honeycomb materials, are generally preconstructed ("kitted") and arranged for use in conjunction with the present invention. For example, the honeycomb material is premanufactured and supplied for use in conjunction with the present invention. More particularly, the honeycomb material is provided in the form of sections or panels that are laid onto a receiving surface in a predetermined fashion. A resin film retains the honeycomb panels to the receiving surface during formation of a hybrid composite structure in accordance with the present invention. As explained in more detail later, an adhesive disposed on removable backing paper or plastic film applies to the receiving surface for forming the resin film prior to application of the honeycomb panels.

The polymeric matrix composite preferably comprises generally uniformly oriented strengthening fibers, such as graphite, boron and/or other strengthening fibers, enveloped in a high temperature polymeric resin to form a strand-like arrangement of polymeric matrix composite. A preferred resin comprises a dry thermoplastic or dry (volatileless) thermosetting resin. The polymeric matrix composite preferably comprises tow impregnated with polymeric resin, with the resin-impregnated tow wound on a spool. More particularly, the polymeric matrix composite preferably comprises filaments for forming the strengthening fibers, collected into a loose assemblage substantially without twist and enveloped or coated with the polymeric resin. Alternatively, the polymeric matrix composite may be in the form of conventional polymeric resin impregnated tape that has been slit into substantially smaller widths (typically from 1/8 to 1/4 inch in width) and wound on a spool. In forming the hybrid composite structure, the tow or slit tape unwinds from the spool onto the receiving surface while being subjected to heat and pressure for consolidation of the polymeric matrix composite.

The titanium foil is usually supplied in the form of large rolls. Referring to FIG. 1, the foil is first received at a receiving location (14) and then is trimmed or cut into gore strips of predetermined length by a conventional cutting machine (16). In the context of a fuselage section, a gore strip is a longitudinal piece that extends from one end to the other of the fuselage section. In fuselage sections having a varying or changing circumference, gore strips must be cut with varying width so that successive gore strips can be applied in an edge-to-edge relationship, preferably without overlap while ensuring gaps between adjacent strips do not exceed a maximum specified tolerance.

The gore strips are anodized to form an exterior coat on each gore strip suitable for bonding to the previously referenced polymeric matrix composite. In this regard, the anodization process forms a dendritic structure on the exterior of each gore strip that a polymeric resin can penetrate and effectively bond to. The anodizing process (18) may include conventional chromic acid anodization, which has been proven effective for use in forming hybrid composite structures.

A priming process (19) follows the anodization process (18). The priming process applies a polymeric resin, either thermoplastic or thermosetting type, to the gore strips. The polymeric matrix composite may not include sufficient excess resin for ensuring a good bond to the gore strips. Thus, the priming process (19) ensures a sufficient mount of resin between the gore strips and the polymeric matrix composite for a good bond.

In accordance with the present invention, the gore strips are loaded onto a spool or cassette (20). These cassettes are delivered to a storage location (24) near the production facility and stored until they are to be utilized in the lamination process. The lay-up mandrel is removed from tool storage (28) and moved to the autolamination site (26). The hybrid composite structure is applied to the mandrel by the lamination procedures described below. Thereafter, the mandrel is removed from the construction site and extracted from the hybrid composite structure. The hybrid composite structure is trimmed, window openings are cut in the structure, and other fastening devices and components are added to form a finished structure (30).

Figure 2:
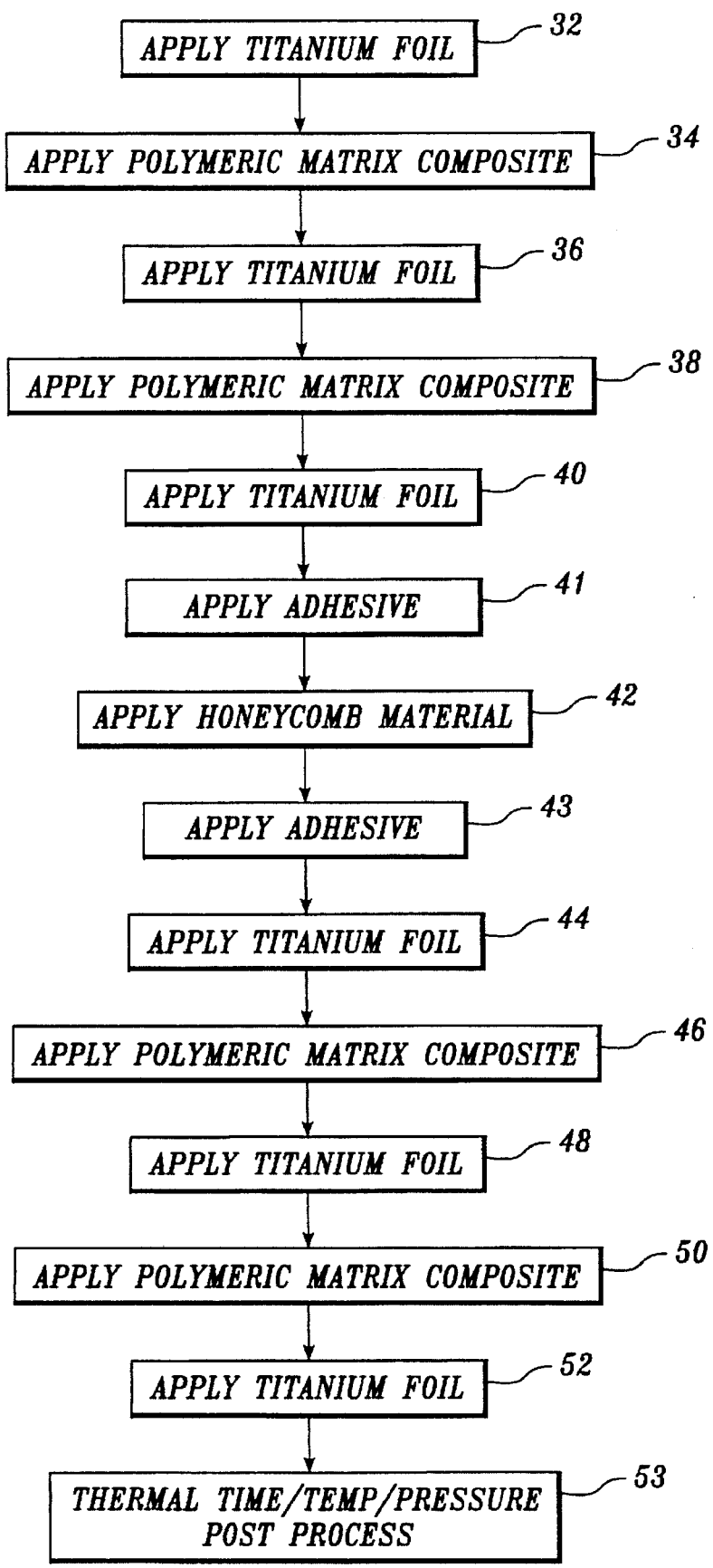
FIG. 2 is a schematic flow diagram illustrating a preferred method for applying gore strips to a mandrel along with honeycomb and polymeric matrix composite material, to construct a hybrid composite structure in accordance with the present invention.

In accordance with the present invention, the steps for preparing one hybrid composite structure, for example, a fuselage section, are illustrated in FIG. 2. In this example, a tubular mandrel is erected generally with its longitudinal axis oriented in a vertical direction. A plurality of titanium gore strips are applied in a longitudinal direction to the exterior surface of the mandrel to form a first layer of titanium foil (32). Polymeric matrix composite in the form of tow or slit tape is wound about the mandrel in a direction transverse and preferably helically oriented relative to the mandrel until a first layer of polymeric matrix composite has been formed (34). A second layer of titanium foil is then applied (36) to the composite layer, followed by another layer of composite material (38) and a final layer of titanium foil (40). This provides a first interior skin comprising three layers of titanium foil interleaved with layers of polymeric matrix composite.

Thereafter, the honeycomb lay-up steps occur (41), (42) and (43). The first step of the honey comb lay-up includes an adhesive applying process (41). The adhesive applying process forms a resin film on the outer surface of the first interior skin formed in the preceding steps for retaining honeycomb panels to the skin. Preferably, an adhesive disposed on a narrow strip of removable backing paper or plastic film applies to the skin for forming the resin film. The adhesive strip winds onto a spool for convenient dispensing as required. More particularly, the adhesive strip dispenses from the spool onto the skin in a manner similar to the application process for polymeric matrix composite as described in more detail later. The adhesive strip dispensing process preferably removes the paper or film backing as the strip unwinds from the spool onto the skin. Alternatively, the paper or film backing may be removed in a separate step following application of the adhesive strip.

The next step of the honeycomb lay-up includes a honeycomb application process (42). As will be described in more detail, honeycomb panels are applied over the adhesive film on the outside of the first interior skin. Thereafter, the honeycomb lay-up concludes with a second adhesive applying process (43) substantially identical to the first adhesive applying process (41). The difference between the first and second adhesive applying processes (41) and (43) is that the second process forms a resin film on the outer surface of the honeycomb panels, not the first interior skin.

Thereafter, a second exterior skin of titanium and polymeric matrix composite layers is formed. The first layer of titanium foil in the second skin is applied to the exterior of the honeycomb layer (44). Next, a first exterior layer of polymeric matrix composite is applied (46), followed by successive layers of titanium foil (48), polymeric matrix composite (50), and a final outer layer of titanium foil (52). In this manner, the central honeycomb core is interleaved between the first interior skin of titanium/polymeric matrix composite and a second exterior skin of titanium/polymeric matrix composite. Once the mandrel is removed, the structure forms a strong, rigid fuselage section which has a high strength-to-weight ratio and because of the materials used can withstand the high temperatures associated with high-speed supersonic flight. The entire structure may be subjected to a final post heat and pressure process (53), such as in an autoclave, to ensure full consolidation and bonding of the various layers, either before or after openings are cut into the structure.

Figure 3:
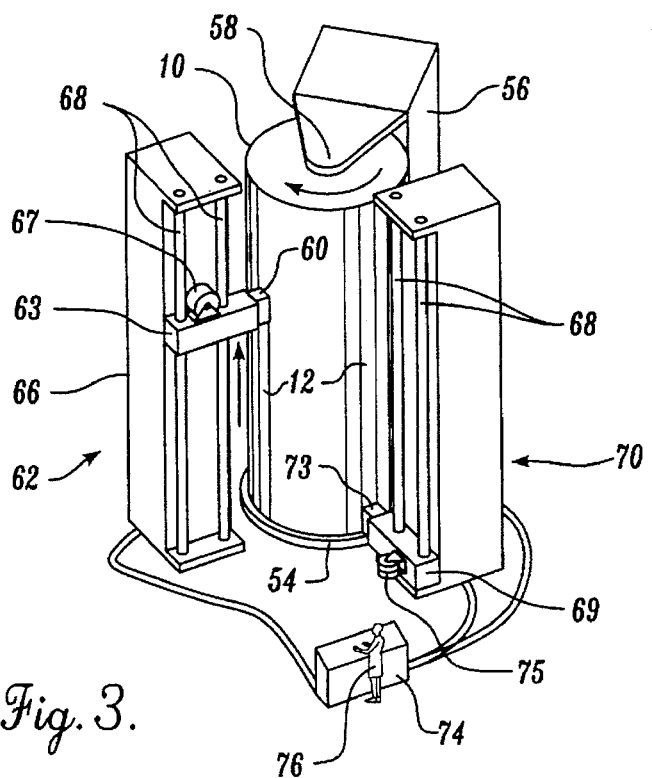
FIG. 3 is a perspective view of metal gore strips being applied to a lay-up mandrel using the method described in conjunction with FIG. 2.

The hybrid composite structure is formed on a mold, or lay-up mandrel 10 as shown in FIG. 3. Preferably, the lay-up mandrel 10 corresponds generally in shape to the shape of the component to be formed by the hybrid composite structure. In its simplest form, the lay-up mandrel 10 is substantially cylindrical in shape for forming a cylindrical fuselage section for use in an airplane, such as in a supersonic civilian transport aircraft. The various layers of the hybrid composite structure are formed around the lay-up mandrel 10 to form a hybrid composite structure having a generally cylindrical shape. More complex shapes, for example, fuselage sections having a varying diameter can also be formed in accordance with the invention.

Still referring to FIG. 3, the titanium foil layers used in constructing the composite hybrid structure are formed from ribbons of foil or gore strips 12. More particularly, the individual gore strips 12 are cut or slit from sheets of titanium alloy foil and pretreated as described above. Preferably, the foil sheets have a thickness of approximately 0.005 inches.

Each gore strip 12 is positioned on the lay-up mandrel 10 with the longitudinal axis of the gore strip substantially parallel to the longitudinal axis of the lay-up mandrel. The gore strips 12 are successively applied around the circumference of the lay-up mandrel 10 in an edge-to-edge relationship to form a smooth, continuous titanium foil layer covering the lay-up mandrel.

As described above, titanium foil is cut or slit into ribbons to form the gore strips 12. Preferably, a conventional cutting machine slits the titanium foil into the gore strips 12. The cutting mechanism in the machine may be a high velocity, abrasive fluid jet for slitting the foil sheets into gore strips 12, such as water and garnet particles or other type particles in the water. Alternatively, the cutting machine may employ powered shears, or other cutting methods. The gore strips 12 each have a substantially rectangular shape for use on the cylindrical lay-up mandrel 10. The rectangularly-shaped gore strips 12 each cover an approximately equal area of the cylindrical lay-up mandrel 10. The edges of adjacent gore strips 12 are positioned to form a smooth layer of titanium foil covering the lay-up mandrel 10.

For use with lay-up mandrels having other geometries, the gore strips 12 preferably have other shapes. For example, with a conically-shaped lay-up mandrel, the gore strips 12 would preferably have a trapezoidal shape, i.e., one end of the gore strips would be wider than the other end. Thus, when the gore strips are laid upon a conical lay-up mandrel in edge-to-edge relationship, the wider ends would be proximate the base of the cone shape. Each gore strip would therefore cover an approximately equal area of the lay-up mandrel for forming a smooth titanium foil layer. Accordingly, slitting the foil into gore strips 12 includes pre-calculating the shape of the gore strips so that each gore strip covers an approximately equal area of the lay-up mandrel. Hence, when the gore strips 12 are placed in edge-to-edge relationship on the lay-up mandrel, the gore strips form a smooth titanium foil layer.

The autolamination procedure for constructing a hybrid composite structure is shown in part in the series of perspective views of FIGS. 3 through 7. The lay-up mandrel 10 is supported on a carousel 54. In the preferred embodiment, the carousel 54 supports the lay-up mandrel 10 with the longitudinal axis of the lay-up mandrel oriented generally vertically. Vertically orienting the lay-up mandrel 10 minimizes deflections in the lay-up mandrel and/or in later described machinery that applies layers of the hybrid composite structure to the lay-up mandrel 10.

The carousel 54 includes a stand 56 extending generally vertically upward, proximate one side of the carousel. A finger 58 cantilevers from the upper end of the stand 56 and rotatably supports the upper end of the lay-up mandrel 10. Preferably, the lay-up mandrel 10 includes ends that are adapted for rotatable support.

A strip laying machine 62 for applying the gore strips 12 to the lay-up mandrel 10 is provided. The strip laying machine 62 includes a carriage assembly having a generally vertical stand 66 proximate the lay-up mandrel 10. The stand 66 supports a pair of spaced, substantially parallel, generally vertical rails 68 to which a carriage 63 movably mounts. In this regard, the carriage assembly includes an internal prime mover and associated apparatus (not shown) that moves the carriage 63 vertically along the rails 68. For example, the prime mover may operate a screw-jack mechanism that connects to the carriage 63 for moving the carriage along the rails 68.

A spool or cassette 67 carrying one or more gore strips 12 removably mounts to the carriage 63. The cassette 67 supplies gore strips 12 to an in-situ consolidation head 60 mounted to the end of the carriage 63 nearest the lay-up mandrel 10. As the carriage 63 moves along the rails 68, the in-situ consolidation head 60 applies gore strips 12 to the lay-up mandrel 10. The in-situ consolidation head 60 is preferably a conventional tape-laying head having an in-situ consolidation mechanism, wherein the tape-laying head has been adapted for applying gore strips 12 instead of tape. Conventional in-situ consolidation heads are disclosed in published references, such as in the Ph.D. dissertation of Kuo-Shih Liu entitled "A MATHEMATICAL MODEL FOR AN IN-SITU CONSOLIDATION OF THERMOPLASTIC COMPOSITES," dated 1995 and available through Stanford University in Palo Alto, Calif. A technical report published by and available from the University of Delaware Center for Composite Materials, entitled "DESIGN AND OPTIMIZATION OF A THERMOPLASTIC TOW-PLACEMENT PROCESS WITH IN-SITU CONSOLIDATION" also discusses conventional types of in-situ consolidation heads.

In applying the gore strips 12, the carriage 63 repeatedly moves from the bottom end of the rails 68, to the upper end and back to the bottom. As the carriage 63 moves, a gore strip 12 is played from the cassette 67 through the in-situ consolidation head 60 and applied along the length of the lay-up mandrel 10. In the preferred embodiment, the carriage 63 moves from the lower end of the lay-up mandrel 10 to the upper end to apply each gore strip 12. After applying a gore strip 12, the carriage 60 returns to the lower end before beginning to apply another gore strip.

Alternatively, the carriage 60 may apply gore strips 12 while traveling in both upward and downward directions. Specifically, the carriage 63 may move from one end to the other end of the lay-up mandrel 10 to apply a gore strip 12 and then move in the reverse direction to apply the next gore strip.

A conventional agent, often referred to as a "tackifier," preferably adheres each gore strip 12 to the lay-up mandrel 10. The tackifier may be a polymeric resin or other suitable material and sprayed, painted or otherwise applied to the lay-up mandrel 10. The tackifier forms a resin film on the lay-up mandrel 10 that provides high tack and does not adversely affect the quality of the part being manufactured. Suitable classes of resin for the tackifier include thermoplastic or thermosetting types typically used in manufacturing composite parts. As the strip laying machine 62 applies each gore strip 12, the consolidation head 60 applies heat and pressure to the gore strip to at least partially bond the gore strip to the resin film. In particular, the consolidation head 60 uses a superheated gas such as nitrogen, or other method to heat each gore strip 12 as the strip dispenses, and a pressing mechanism, such as roller to apply pressure. The heat and pressure at least partially consolidates and cures the resin film underlying the gore strip 12, thereby bonding the strip to the lay-up mandrel 10.

A vacuum system (not shown) may be used alone or in conjunction with the previously described tackifier for retaining gore strips 12 to the lay-up mandrel 10. The vacuum system includes a plurality of small holes distributed over the surface of the lay-up mandrel 10 and an air pump. As the strip laying machine 60 applies each gore strip 12 to the lay-up mandrel 10, the air pump applies a partial vacuum to the interior of the mandrel such that air pressure presses the gore strips against the lay-up mandrel surface.

Alternatively, clips or other clamping apparatus may retain the ends of each gore strip 12 to the ends of the lay-up mandrel 10. For example, before the strip laying machine 62 applies a gore strip 12, one end of the gore strip extends from the strip laying machine 62, which is clipped to the end of the lay-up mandrel 10 nearest the strip laying machine 62. Thereafter, the strip laying machine 62 moves from that end of the lay-up mandrel 10 to the other end, where the opposite end of the gore strip 12 is clipped to the lay-up mandrel 10. Clamping apparatus may be used alone, or in combination with the previously described vacuum system and/or tackifier.

After the strip laying machine 62 applies a gore strip 12, the carousel 54 supporting the lay-up mandrel 10 rotates about its vertical axis. The carousel 54 rotates by a predetermined amount so that the periphery of the lay-up mandrel 10 moves a distance relative to the strip laying machine 62 approximately equal to the width of a gore strip 12. Thereafter, the strip laying machine 62 applies another gore strip 12 adjacent the just previously applied gore strip. These steps are repeated until gore strips 12 extend circumferentially around the lay-up mandrel 10 in an edge-to-edge relationship.

Figure 4:
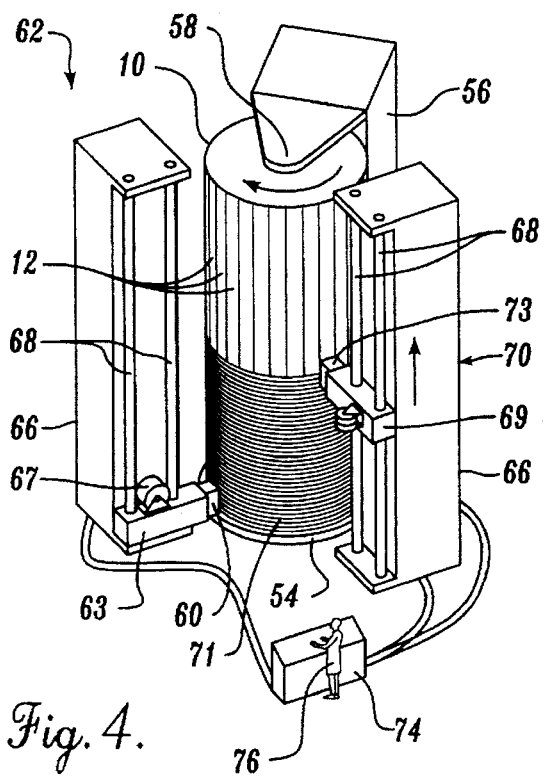
FIG. 4 is a perspective view of a layer of polymeric matrix composite material being applied to the layer of metal gore strips of FIG. 3, using the method described in conjunction with FIG. 2.
Figure 5:
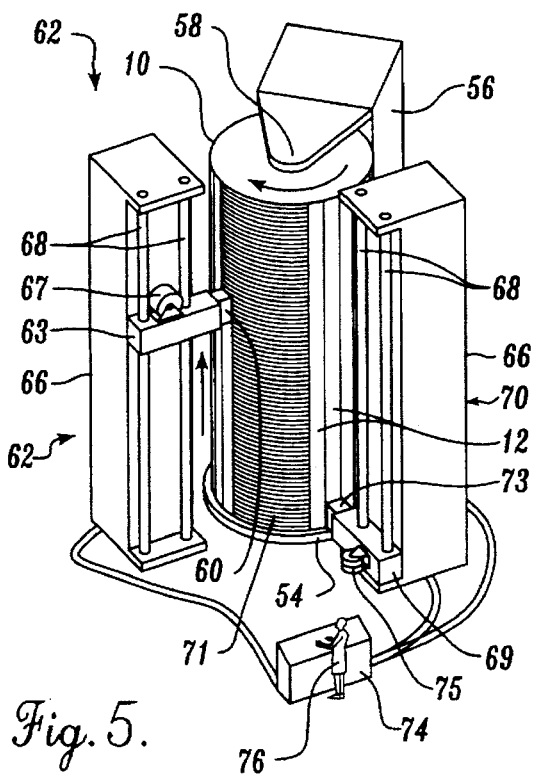
FIG. 5 is a perspective view of metal gore strips being applied to the layer of polymeric matrix composite material of FIG. 4, using the method described in conjunction with FIG. 2.

As shown in FIGS. 4 and 5, the autolamination machine further includes an advanced fiber placement machine 70. The fiber placement machine 70 applies polymeric matrix composite 71 to the lay-up mandrel 10 in the form of polymeric resin impregnated slit tape or tow. In this regard, the impregnating resin is preferably a thermoplastic or pseudo thermoplastic type such as PETI-5, which is a designation the NASA Langley Research Center uses for a particular resin. PETI-5 is available from Cytec Engineered Materials Inc. of Anaheim, Calif. Generally, thermosetting polyimide types of resin are used for parts having high temperature use requirements, such as in supersonic aircraft. Commercially available thermoplastic resins include polyether ether-ketone, often called "PEEK," and manufactured by ICI-Fiberite of Orange, Calif., or polyether ketone-ketone, often called "PEKK," and manufactured by DuPont, of Wilmington, Del. New thermoplastic resins under development for making parts subject to high temperatures can also be used as these resins become available. Epoxy resins may be used in applications having lower temperature use requirements, such as in subsonic aircraft.

The fiber placement machine 70 includes a carriage assembly substantially identical to the carriage assembly for previously described strip laying machine 62. Specifically, the carriage assembly for the fiber placement machine 70 includes a generally vertical stand 66 proximate the lay-up mandrel 10. The stand 66 for the fiber placement machine 70 supports a pair of spaced apart, substantially parallel, generally vertical rails 68. A carriage 69 movably mounts to the rails 68 so that the carriage may travel along the length of the rails.

A conventional advanced fiber placement in-situ consolidation head 73 mounts to the end of the carriage 69 nearest the lay-up mandrel 10. Suitable types of in-situ consolidation heads are disclosed in the previously referenced Ph.D. dissertation entitled "A MATHEMATICAL MODEL FOR AN IN-SITU CONSOLIDATION OF THERMOPLASTIC COMPOSITES" and in the previously referenced technical report entitled "DESIGN AND OPTIMIZATION OF A THERMOPLASTIC TOW-PLACEMENT PROCESS WITH IN-SITU CONSOLIDATION."

The fiber placement in-situ consolidation head 73 applies polymeric matrix composite 71 to the lay-up mandrel 10. As previously discussed, the polymeric matrix composite 71 preferably comprises slit tape or tow impregnated with a polymeric resin and wound on a spool 75. The spool 75 mounts to the carriage 69 for dispensing the polymeric matrix composite 71 as required by the in-situ consolidation head 73. The in-situ consolidation head 73 mounts to the rails 68 so that the polymeric matrix composite 71 in the form of slit tape or tow dispenses generally horizontally.

More particularly, after a layer of gore strips 12 has been applied to the lay-up mandrel 10, the carriage 69 supporting the consolidation head 73 moves from one end of the rails 68 to the opposite end. As the carriage 69 moves, the carousel 54 supporting the lay-up mandrel 10 rotates and the consolidation head 73 applies the polymeric matrix composite 71 over the gore strips 12. This causes the polymeric matrix composite 71 in the form of slit tape or tow to be applied to the gore strips 12 in a helical pattern circumferentially surrounding the lay-up mandrel 10. The consolidation head 73 applies heat and pressure to the polymeric matrix composite 71 as the composite dispenses. The heat and pressure serves to at least partially consolidate, cure and bond the polymeric matrix composite 71 to the underlying gore strips 12, obviating the need for clips, clamps, resin film, vacuum system, or other method for retaining the composite to the gore strips 12.

Conventional polymeric resin impregnated tape can be difficult to steer in the plane of the tape. That is, conventional tape creates difficulties when attempting to create a smooth curve in the plane of the tape except at large radiuses of curvature. Therefore, a method in accordance with the present invention relies upon polymeric matrix composite 71 in the form of slit tape or tow for forming a smooth curve over the gore strips 12 in a circumferential, helical pattern about the lay-up mandrel 10. Specifically, slit tape or tow is narrow in width (typically ⅛ to ¼ inches) and can be readily steered in the plane of the material for forming a smooth curve over the gore strips 12 in a circumferential pattern about the lay-up mandrel 10.

After a layer of gore strips 12 has been applied to the lay-up mandrel 10 and a layer of polymeric matrix composite 71 has been applied over the gore strips, a second layer of gore strips is applied over the polymeric matrix composite layer as shown in FIG. 5. Specifically, the head 60 of the strip laying machine 62 is moved along the length of the lay-up mandrel 10 to successively apply each gore strip 12 as described previously. In the preferred embodiment, the edges of the gore strips 12 covering the polymeric matrix composite layer do not radially align with the edges of the gore strip underneath the polymeric matrix composite layer. In particular, there is an offset, which serves to increase the strength of the resulting hybrid composite structure.

Next, a second layer of polymeric matrix composite 71 is applied in the same way that the first layer of polymeric matrix composite is applied (see FIG. 4). Preferably, the edges of the slit tape or tow in the polymeric matrix composite 71 are axially offset from one layer to another to increase the strength of the structure.

The second layer of polymeric matrix composite 71 is in turn covered by a third layer of gore strips 12 in the same way that the second layer of gore strips is applied (see FIG. 5). Preferably, the edges of the gore strips 12 in the second and third layers of gore strips do not radially align, i.e., there is an offset, to maximize the strength of the hybrid composite structure.

Next, the autolamination procedure includes applying an adhesive to the last-applied layer of gore strips 12. The adhesive preferably comprises a polymeric resin of thermoplastic or pseudo thermoplastic type, such as the previously referenced PETI-5. The preferred method of adhesive application includes disposing the adhesive on a strip of removable backing paper or plastic film to form an adhesive strip (not shown). The adhesive strip then winds onto a spool for convenient dispensing. Thereafter, the adhesive strip dispenses from the spool onto a gore strip layer similar to the application process for the polymeric matrix composite 71. Specifically, an adhesive strip laying head (not shown) applies the adhesive strip to the last-applied gore strip layer. The heads 60 or 73 from either the strip laying or fiber placement machines 62 or 70 preferably can be readily removed and replaced with an adhesive strip laying head. Alternatively, a separate machine may be supplied that is dedicated to applying adhesive.

The adhesive applying procedure includes rotating the carousel 54 as the strip laying head applies the adhesive strip to form a first circumferential, generally horizontal adhesive band around the last-applied gore strip layer. The strip laying head may cut the adhesive strip to the required length for forming the band, or the adhesive strip may be pre-cut into a plurality of shorter sections of suitable length. The adhesive strip laying head preferably removes the backing paper or plastic film as the head applies the adhesive strip. Alternatively, the backing paper or plastic film can be removed in a separate manual step, or other process. Removal of the backing paper or plastic film leaves a resin film on the gore strip layer.

Thereafter, the carriage supporting the strip laying head advances a vertical increment approximately equal to the width of the just-applied adhesive band. The carousel 54 then rotates again as the head applies adhesive to form a second circumferential adhesive band adjacent the first-applied adhesive band. This procedure repeats until the gore strip layer has been substantially covered with adhesive. Other procedures can be used, such as applying strips of adhesive lengthwise, similar to the way gore strips 12 apply.

Figure 6:
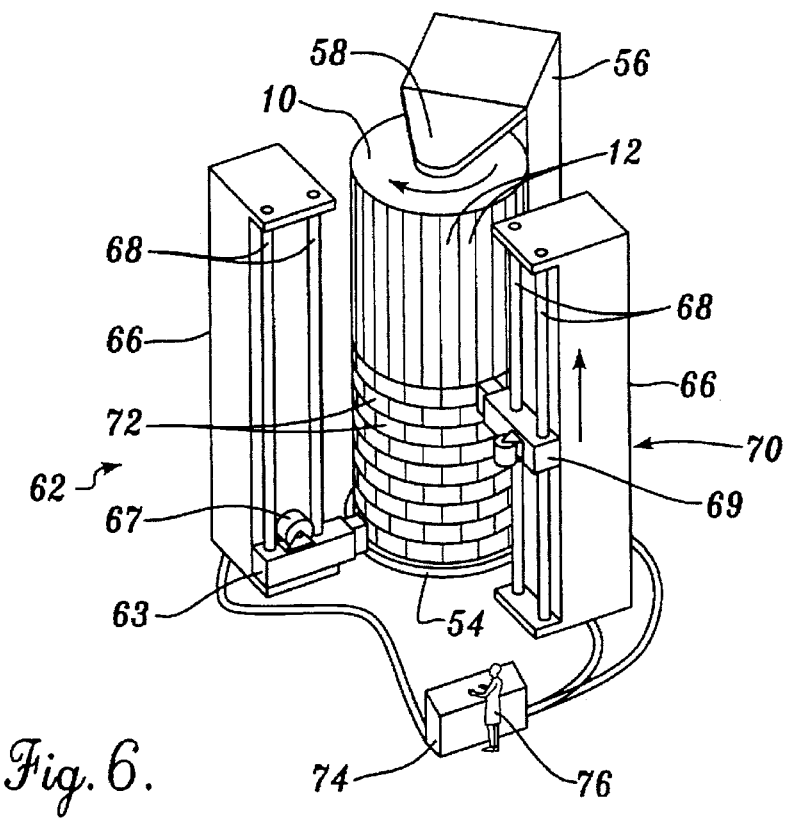
FIG. 6 is a perspective view of a layer of adhesive and honeycomb material being applied to a first skin of metal gore strips and polymeric matrix composite of FIG. 5, using the method described in conjunction with FIG. 2, with adhesive applied over the honeycomb material.

Thereafter, a layer of honeycomb material is applied over the resin film in a plurality of rectangularly shaped panels or sections 72 as shown in FIG. 6. The rectangular sections 72 may be manually applied to the layer of gore strips 12. Alternatively, automatic placement equipment known to one of ordinary skill in automatic placement technology may be used.

The honeycomb material preferably includes a titanium alloy metal core formed generally in hexagonal-shaped cells extending transversely to the surfaces of the sheet. The sheet may have a thickness of approximately ½ inch or other suitable thickness. Each cell in the sheet has a length of approximately 3/16 of an inch between opposing walls of the cell, and each wall has a thickness of approximately 0.003 inch. The sheets are preformed into a plurality of rectangularly shaped sections 72 that are shaped to conform to a particular surface. Thus, they may be flat, have a single curvature, or have a compound curvature, as dictated by a particular mandrel shape. The rectangular sections 72 are applied to the layer of gore strips 12 in an edge-to-edge relationship so as to cover the layer of gore strips 12.

Each rectangular section 72 is pressed against the gore strip layer, while heat is applied to the resin film interface between a rectangular section 72 and the gore strip layer. The heating method may be radiation, induction or other type of heating method that does not apply significant heat to layers of the structure below the resin film/gore strip/ rectangular section interface. The heating at least partially consolidates and cures the resin film to bond each rectangular section 72 to the underlying gore strip layer. Additionally, as each rectangular section 72 is applied, adhesive is applied to the edges of the section. The adhesive is preferably the same type as that used to form the resin film on the underlying gore strip layer, and is heated to bond adjacent rectangular sections 72 to one another in an edge-to-edge relationship. This forms a continuously bonded honeycomb layer, both bonded to and around the underlying layer of gore strips 12.

Preferably, the rectangular sections 72 are applied to the gore strips 12 in generally horizontal rows, circumferentially extending around the lay-up mandrel 10. In the preferred embodiment, the starting positions of adjacent rows are offset from one another. Thus, the vertical edges of rectangular sections 72 in adjacent rows do not align, which maximizes the strength of the hybrid composite structure.

Figure 7:
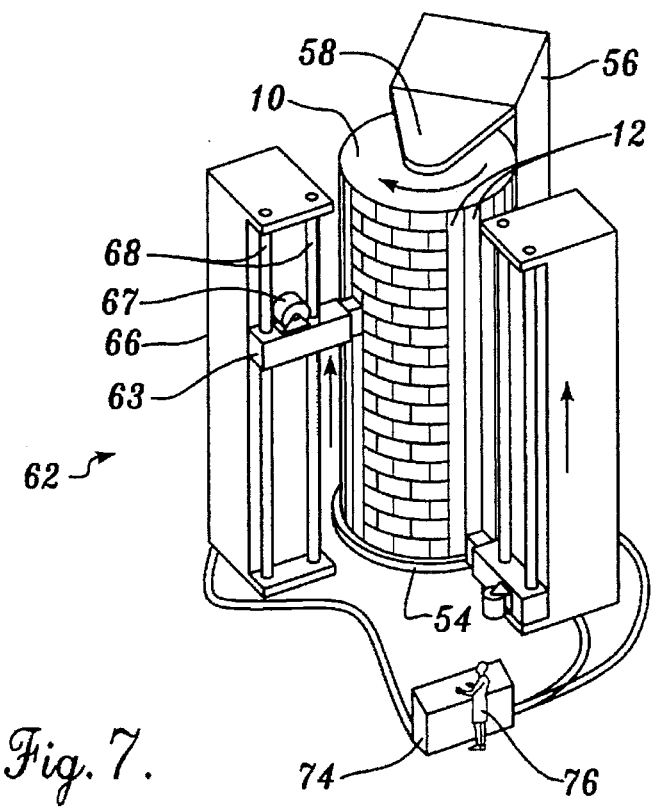
FIG. 7 is a perspective view showing the beginning of the construction of a second skin of metal gore strips and polymeric matrix composite applied to the layer of honeycomb material shown in FIG. 6, using the method described in conjunction with FIG. 2.

Next, an adhesive is applied over the rectangular honeycomb sections 72. The adhesive is preferably substantially the same type and applied in substantially the same way as the adhesive applied to the gore strip layer underlying the honeycomb layer. Then another layer of gore strips 12 is applied over the adhesive and the layer of rectangular honeycomb sections 72 as shown in FIG. 7. These strips 12 are applied in a manner similar to the original gore strips of the inner sandwich as described in conjunction with FIGS. 3 and 5. The adhesive creates a resin film on the rectangular honeycomb sections 72. As described previously, the in-situ consolidation head 60 of the strip laying machine 62 heats each gore strip 12 as it is applied. The heating at least partially consolidates and cures the resin film, thereby bonding each gore strip 12 to the underlying layer of rectangular honeycomb sections 72.

Thereafter, a layer of polymeric matrix composite 71 is applied over the last layer of gore strips 12 as described in connection with FIG. 4. Another layer of gore strip 12 is applied to this layer of polymeric matrix composite 71 as described in connection with FIG. 5. The layer of gore strips 12 is followed by a final layer of polymeric matrix composite 71 and a final layer of gore strips 12, which completes the autolamination procedure. Following the autolamination procedure, the ends of the gore strips 12 are unclipped or unclamped, if necessary, and trimmed to be substantially even with the ends of the lay-up mantel 10.

There may be applications for a hybrid composite structure that subject certain areas of the structure to substantially greater forces. For these applications, the autolamination procedure includes reinforcing these areas of the structure. The reinforced areas include additional alternating layers of polymeric matrix composite 71 and gore strips 12. However, in the reinforced areas, the gore strips 12 preferably form circumferential bands.

Specifically, to form the reinforced areas, the head 60 of the strip laying machine 62 rotates approximately ninety degrees (not shown). The carousel 54 then rotates as each gore strip 12 applies so that each gore strip circumferentially surrounds the lay-up mandrel 10. Preferably, each reinforcing layer of gore strips 12 is interleaved with a reinforcing layer of polymeric matrix composite 71 so that there is always a layer of polymeric matrix composite between each gore strip layer. After applying each gore strip 12, the carriage 63 supporting the head 60 moves a vertical increment approximately equal to the width of a gore strip. Then the head 60 applies another gore strip 12 adjacent the last-applied applied gore strip as the carousel 54 rotates. This procedure continues until the area to be reinforced has been covered with gore strips 12.

As indicated in FIGS. 3 through 7, the carousel 54 and carriage assemblies 62 and 70 may connect to a control panel 74. The control panel 74 provides a centralized location for controlling the above-described procedure by personnel 76, resulting in further labor savings. The control panel may readily be coupled to the carousel, the panel and tape-laying machine by one of ordinary skill in the machine control arts.

After the composite structure is formed, the lay-up mandrel 10 is removed from the carousel 54 and the hybrid composite structure is removed from the lay-up mandrel 10. Thereafter, openings, such as windows, doors, access panels, etc., may be cut into the structure for use in forming an aircraft or other product. The autolamination procedure may be carded out with sufficient heat and pressure applied to the materials as each layer is formed such that the various layers are fully consolidated and/or bonded to one another. Alternatively, the entire structure may be subjected to a final heat and pressure process, such as in an autoclave, either before or after openings are cut into the structure, to ensure full consolidation and bonding.

While the preferred embodiment of the invention has been illustrated and described, it will be appreciated that various changes can be made therein without departing from the spirit and scope of the invention. For example, the lay-up mandrel 10 could be rotatably supported about its longitudinal axis in a generally horizontal or other non-vertical orientation; the strip laying and fiber placement machines 62 and 70 could be constructed to move about a stationary (non-rotating) lay-up mandrel, such as for a wing panel; gore strips 12 could be formed as continuous ribbons that are wound onto a cassette and cut to length as the strip laying machine 62 dispenses the gore strips; enough heat and pressure could be applied to the various layers as they are formed to eliminate the need for a final consolidation and bonding process in an autoclave; and adhesive could be manually applied to the honeycomb layer and/or to the gore strip layer underlying the honeycomb layer instead of using machinery. In view of these and other alterations, substitutions and modifications that could be made by one of ordinary skill in the art, it is intended that the scope of Letters Patent granted hereon be limited only by the definitions of the appended claims.

The embodiments of the invention in which an exclusive property or privilege is claimed are defined as follows:

1. A method for forming a hybrid composite structure on a lay-up mandrel, comprising the steps of:

(a) forming a plurality of metal foil gore strips;

(b) applying a first plurality of the gore strips in a first direction on the lay-up mandrel to form a first layer of gore strips having seams therebetween;

(c) applying strips of a composite material over the first layer of gore strips to form a first layer of composite material on said mandrel, said composite material strips being applied in a direction transverse to the first direction; and (d) applying a second quantity of the gore strips in the first direction over the first layer of composite material, opposite the first layer of gore strips, to form at least a second layer of gore strips to create a skin structure having gore strips as first and last layers of the skin structure.

2. The method of claim 1, wherein the step of applying a first quantity of the gore strips comprises the substeps of:

(a) after forming the gore strips, winding each of the gore strips onto a spool; and (b) unwinding each gore strip from the spool as it is applied to the lay-up mandrel.

3. The method of claim 2, wherein the mandrel is tubular, and the first direction being generally parallel to a longitudinal axis of the tubular mandrel, the method further comprising the substeps of:

(a) moving the spool along the lay-up mandrel in the first direction while unwinding a gore strip from the spool to apply each gore strip to the mandrel;

(b) incrementally rotating the lay-up mandrel a predefined angle about its longitudinal axis after each gore strip is applied; and (c) repeating the steps of moving the spool along the mandrel to apply successive gore strips and rotating the mandrel after each gore strip is applied until all of the first quantity of gore strips have been applied.

4. The method of claim 3, wherein the longitudinal axis of the lay-up mandrel is oriented substantially vertically.

5. The method of claim 1, wherein the step of applying strips of a composite material comprises the substeps of:

(a) supplying the strips in the form of tow in a fiber placement mechanism;

(b) positioning the fiber placement mechanism adjacent the lay-up mandrel;

(c) rotating the lay-up mandrel; and (d) applying the tow to the first layer of gore strips in a circumferential direction as the mandrel is rotated.

6. The method of claim 5, wherein a longitudinal axis of the lay-up mandrel is oriented substantially vertically, said method comprising the further step of moving said fiber placement mechanism longitudinally along said mandrel as said mandrel is rotated and said tow is laid so as to lay said tow in a helical pattern over said gore strips.

7. The method of claim 1, further comprising the step of applying a layer of honeycomb material over the last layer of the first skin structure.

8. The method of claim 7 comprising repeating the steps of claim 1 so as to apply gore strips and composite material over the honeycomb material so as to sandwich said honeycomb layer between layers of gore strips.

9. The method of claim 1, wherein the lay-up mandrel forms a surface suitable for forming a panel for use in an aircraft wing structure.

10. A method of forming a hybrid composite structure on a tubular lay-up mandrel, the mandrel having an axis, comprising the steps of:

(a) providing a foil comprising a metal alloy in a form of a ribbon;

(b) applying a first section of the ribbon to the lay-up mandrel in an axial direction to form a gore strip, and applying successive ribbon sections displaced circumferentially from previously laid ribbon sections to form a first layer of gore strips on said mandrel;

(c) applying a composite material to the first layer of gore strips to form a first layer of composite material; and (d) applying a second plurality of ribbon sections to the first layer of composite material, opposite the first layer of gore strips, to form at least one other layer of gore strips.

11. The method of claim 10, wherein the step of applying a first section of the ribbon, comprises the substeps of:

(a) winding the ribbon onto a spool; and (b) unwinding the ribbon from the spool to apply a section of the ribbon to the lay-up mandrel as said spool is moved axially along said mandrel.

12. The method of claim 11, further comprising the substeps of:

cutting the ribbon to length after the spool has been moved along the length of the lay-up mandrel to form a gore strip on the lay-up mandrel.

13. The method of claim 12, further comprising the substep of incrementally rotating the lay-up mandrel a predefined angle after forming a gore strip on the lay-up mandrel so that a second gore strip can be formed adjacent the previously formed gore strip.

14. The method of claim 12, wherein the axis of the lay-up mandrel is oriented substantially vertically and the lay-up mandrel is rotated about its axis.

15. The method of claim 10, wherein the step of applying a composite material comprises the substeps of:

(a) supplying composite material in the form of tow in a fiber placement mechanism;

(b) positioning the fiber placement mechanism adjacent the lay-up mandrel; and (c) rotating the lay-up mandrel about its axis; and (d) using the fiber placement mechanism to dispense and apply tow to the first layer of gore strip to form a first layer of composite material on said gore strips.

16. The method of claim 15 comprising the substep of:

(a) moving the fiber placement mechanism substantially vertically in an axial direction along the lay-up mandrel;

(b) rotating the lay-up mandrel about its axis; and (c) applying tow to the mandrel in a helical pattern as the mandrel is rotated and the fiber placement mechanism is moved vertically.

17. A method of forming a hybrid composite structure, comprising the steps of:

(a) forming a plurality of strips of a metal alloy, wherein each strip includes opposed edges, and a longitudinal axis located therebetween;

(b) providing a lay-up mandrel having a longitudinal axis;

(c) applying strips of the metal ahoy to the lay-up mandrel in edge- to-edge relationship, with the longitudinal axis of the strips generally parallel to the longitudinal axis of the lay-up mandrel to form a first layer of strips of the metal alloy;

(d) applying a composite material to the first layer of strips of the metal alloy to form a layer of composite material; and (e) applying strips of the metal alloy over the composite material in edge-to-edge relationship, with the longitudinal axis of the strips generally parallel to the longitudinal axis of the lay-up mandrel to form at least one other layer of strips of the metal alloy.

18. The method of claim 17, wherein the step of applying strips of the metal alloy comprises the substeps of:

(a) first winding each of the strips of the metal alloy onto a spool; and (b) unwinding each strip of the metal alloy from the spool while applying each strip to the lay-up mandrel.

19. The method of claim 18, further comprising the substeps of:

(a) moving the spool longitudinally along the lay-up mandrel while applying each strip of the metal alloy wound thereon;

(b) rotating the lay-up mandrel a predefined angle after each strip of the metal alloy is applied so that another strip of the metal alloy can be applied adjacent the previously applied strip; and (c) repeating the steps of moving a spool along the mandrel to apply a strip of the metal alloy and rotating the lay-up mandrel until a layer of strips of the metal alloy have been formed on said mandrel.

20. The method of claim 17, wherein the step of applying a composite material comprises the substeps of:

(a) supplying composite material in the form of strand means;

(b) loading the strand means onto a fiber placement mechanism;

(c) moving the fiber placement mechanism longitudinally along the lay-up mandrel to apply the composite material to the first layer of strips of the metal alloy in a direction transverse to a longitudinal orientation of the strips of the metal alloy; and (d) rotating the lay-up mandrel as the composite material is applied to the first layer of strips of the metal alloy to surround the first layer of strips of the metal alloy in a helical pattern of composite material.

21. The method of claim 17, further comprising the step of applying heat and pressure to the composite material as the material is applied to fully consolidate the composite material.

\* \* \* \* \*

UNITED STATES PATENT AND TRADEMARK OFFICE
CERTIFICATE OF CORRECTION

PATENT NO. : 5,651,850
DATED : July 29, 1997
INVENTOR(S) : C.W. Turner et al.

It is certified that error appears in the above-indentified patent and that said Letters Patent is hereby corrected as shown below:

| COLUMN | LINE | |
|---|---|---|
| 13 | 9 | "alter" should read --after-- |
| (Claim 2, | line 3) | |
| 13 | 46 | after "the" delete "first" |
| (Claim 7, | line 3) | |
| 14 | 51 | "ahoy" should read --alloy-- |
| (Claim 17, | line 7) | |
| 14 | 52 | "edge -to-edge" should read --edge-to-edge-- |
| (Claim 17, | line 8) | |

Signed and Sealed this

Twenty-fifth Day of November, 1997

*Attest:*

BRUCE LEHMAN

*Attesting Officer*   *Commissioner of Patents and Trademarks*